United States Patent
Buckley et al.

(10) Patent No.: US 7,433,715 B2
(45) Date of Patent: Oct. 7, 2008

(54) MOBILE STATION FOR TELECOMMUNICATIONS SYSTEM

(75) Inventors: Anthony Robert Buckley, West Ealing (GB); Nic Andrew Redshaw, Windsor (GB); Richard Peter Verney, Knaphill (GB)

(73) Assignee: Agere Systems, Inc., Allentown, PA (US)

( * ) Notice: Subject to any disclaimer, the term of this patent is extended or adjusted under 35 U.S.C. 154(b) by 585 days.

(21) Appl. No.: 09/854,256

(22) Filed: May 11, 2001

(65) Prior Publication Data

US 2002/0049079 A1    Apr. 25, 2002

(30) Foreign Application Priority Data

May 11, 2000    (EP)    .................................. 00303977

(51) Int. Cl.
*H04M 1/00* (2006.01)

(52) U.S. Cl. .............. 455/569.1; 455/575.1; 455/575.2; 455/567; 455/569.2; 455/90.2; 379/420.01; 379/420.04; 379/423; 379/424; 379/433.06; 379/433.1; 379/434

(58) Field of Classification Search ... 455/575.1–575.2, 455/90.1–90.3, 569.1–569.2, 564, 567; 379/433.01–433.03, 433.1, 430, 420.01–420.04, 379/422–427, 433.06, 433.11, 434
See application file for complete search history.

(56) References Cited

U.S. PATENT DOCUMENTS

| | | | | |
|---|---|---|---|---|
| 4,558,178 A | * | 12/1985 | Yasuda et al. ................ 455/567 |
| 5,191,602 A | | 3/1993 | Regen et al. .................... 379/58 |
| 5,224,151 A | * | 6/1993 | Bowen et al. ............. 455/569.1 |
| 5,227,667 A | * | 7/1993 | Takinami et al. ............. 307/129 |
| 5,504,812 A | | 4/1996 | Vangarde ..................... 379/430 |
| 5,554,973 A | * | 9/1996 | Kawashima et al. ......... 340/562 |
| 5,729,604 A | * | 3/1998 | Van Schyndel ........ 379/388.01 |
| 6,038,457 A | * | 3/2000 | Barkat ..................... 455/556.1 |
| 6,115,620 A | * | 9/2000 | Colonna et al. .......... 455/569.1 |
| 6,301,491 B1 | * | 10/2001 | Gong ...................... 455/569.1 |
| 6,397,087 B1 | * | 5/2002 | Kim et al. ................ 455/569.1 |
| 6,434,407 B1 | * | 8/2002 | Cook ...................... 455/569.1 |

FOREIGN PATENT DOCUMENTS

| | | |
|---|---|---|
| EP | 0840465 A2 | 5/1998 |
| EP | 0912031 A2 | 4/1999 |
| EP | 1154621 A1 | 11/2000 |

* cited by examiner

*Primary Examiner*—Tuan A Tran

(57) ABSTRACT

A mobile telecommunications system has a handset and a headset for connection to the handset. The handset includes an RF transceiver for transmitting an outgoing call and receiving an incoming call, and a processor coupled to the RF transceiver that provides audio signals on a first audio path to an audio transducer in the handset and on a second audio path for an audio transducer in the headsets. The headset and handset include respective button switches arranged that the operation has the effect both of initiating and/or accepting a call, and of routing audio signals to the respective first or second audio paths. Embodiments are described including a separate switch for toggling the audio paths, and automatic sensors for detecting use of the headset or handset.

15 Claims, 5 Drawing Sheets

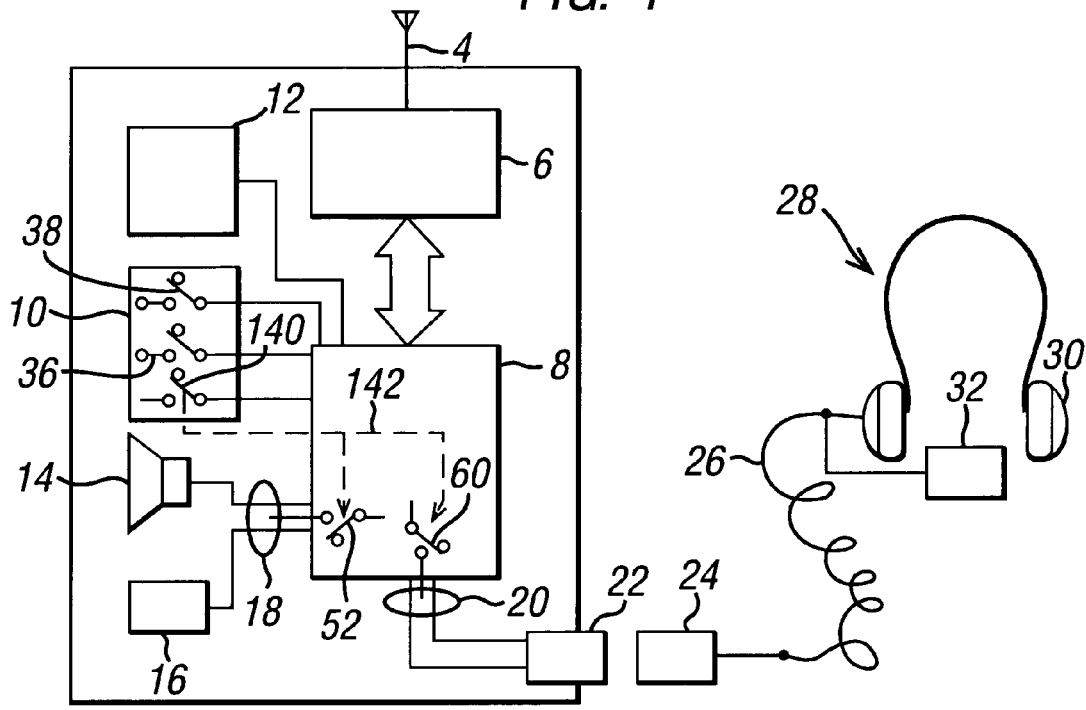
FIG. 4
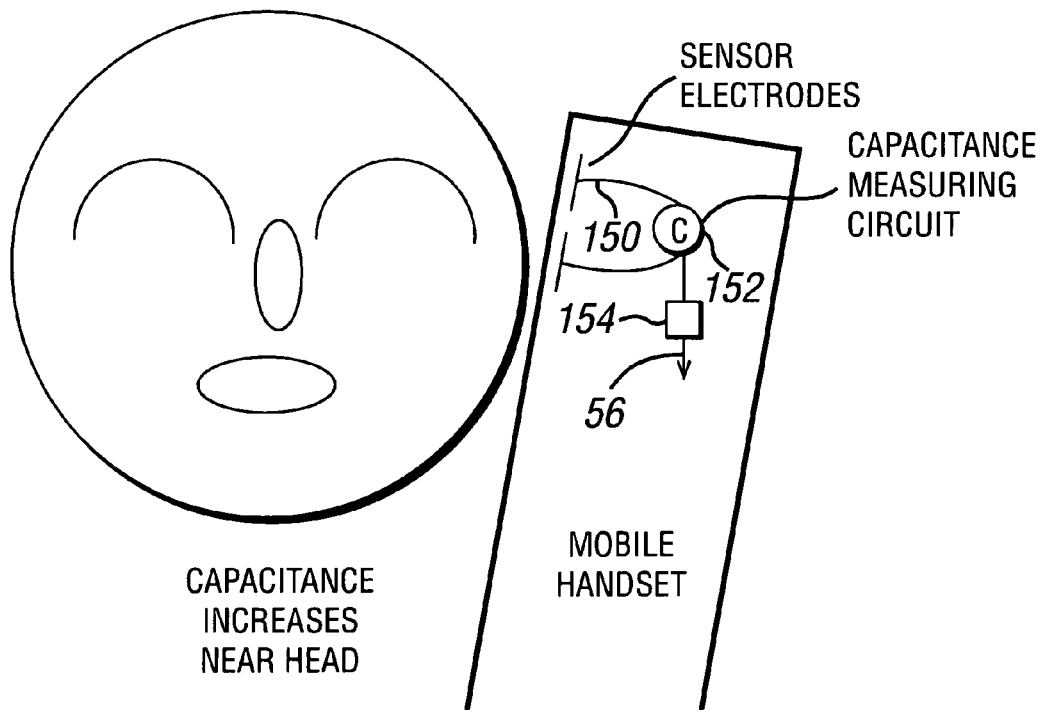
FIG. 5 CAPACITIVE HEAD PROXIMITY DETECTION

FIG. 6 I.R. HEAD PROXIMITY DETECTION
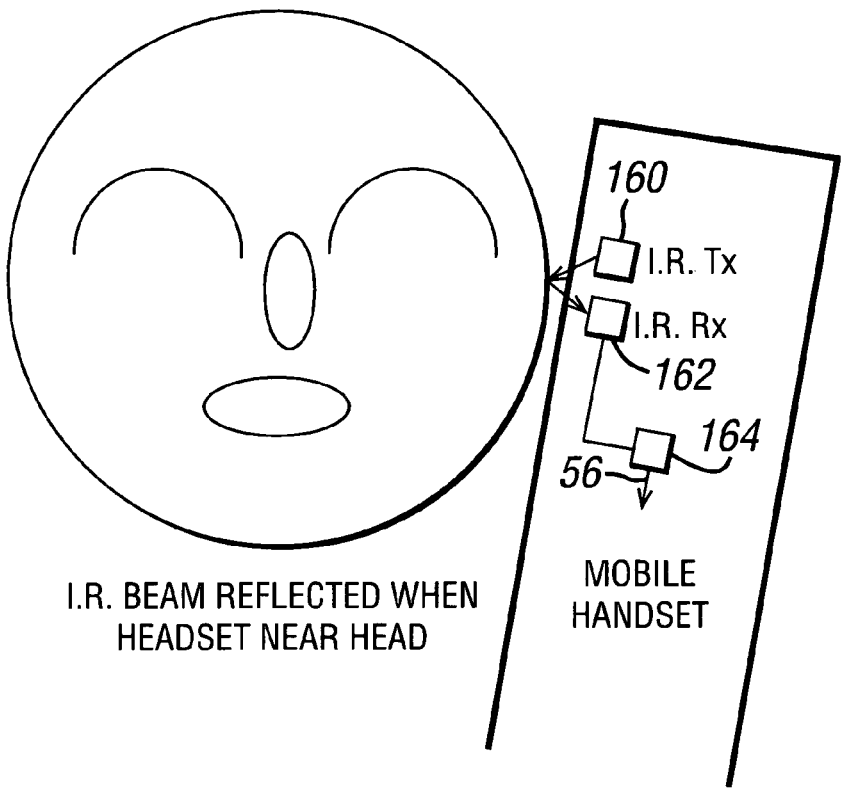
FIG. 7 ACOUSTIC IMPEDANCE EAR DETECTION
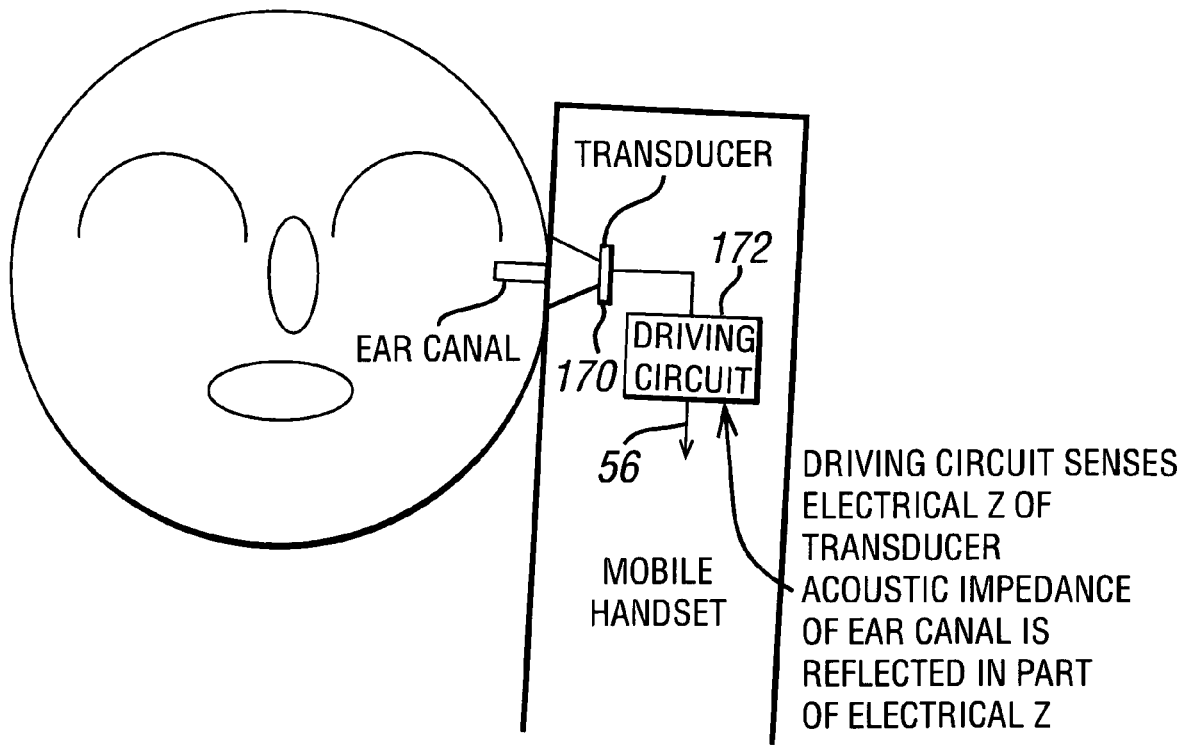

HEADSET HEAD BAND TENSION DETECTION METHOD

MOBILE STATION FOR TELECOMMUNICATIONS SYSTEM

CROSS-REFERENCE TO RELATED APPLICATION

This application claims priority of European Patent Application No. 00303977.3, which was filed on May 11, 2000.

BACKGROUND OF THE INVENTION

The present invention relates to a mobile station for a mobile telecommunications system, in particular a mobile handset with an associated headset.

Mobile handsets with associated headsets are in common use. The headset is to enable handsfree operation and may be corded or cordless. The cord of a corded headset has a terminating plug which is inserted into a terminal in the handset to provide an audio path to the headset. A cordless headset is coupled with the handset by a subsidiary wireless link. The arrangement is shown schematically in FIG. 1. A handset 2 has an antenna 4 coupled to a RF front end, or transceiver section, 6. A digital processing section 8 processes incoming and outgoing calls, and provides control functions. Section 8 is connected to a key pad 10, a display 12, a loudspeaker 14 and microphone 16. Loudspeaker 14 and microphone 16 are coupled to section 8 by lines which provide a first audio path indicated as at 18. A second audio path 20 from section 8 is connected to a socket 22 in the handset for connection with a plug 24 attached to one end of a lead or cord 26, the other end of which is connected to a headset 28 comprising headphones 30 and a microphone 32. When the plug 24 is plugged into the socket, audio is automatically routed to the headset. Key pad 10 includes a switch 36 for accepting an incoming call or initiating an outgoing call, and a switch 38 for terminating a call. Switches 36 and 38 are implemented as finger operable button switches.

The mobile station may, throughout the day, be used in a variety of situations. For example, a user may 'wear' the headset during use in a motorcar, and then may wind the cord of the headset around the handset and put the handset in his pocket. In this situation, with the corded headset connected to the handset, but not worn on the user's head, it is difficult to answer an incoming call quickly. The user either has to unplug the headset or has to quickly 'wear' the headset. With a cordless headset, the difficulty for the user of knowing where the audio is routed, to the handset or headset, is increased.

Thus, there is a problem that may arise in a variety of situations for the user to ascertain where the audio path is routed and what is the most effective way of answering an incoming call. In an extreme situation, an incoming call may be lost.

One possible solution of routing the audio simultaneously both to the handset and to the headset would not be practical, since there would be a great amount of audio feedback resulting in acoustic echo, wherein the handset microphone picks up the generated audio. In addition there would be much degraded ambient noise pick up, adversely affecting listener side tone and send audio noise performance.

SUMMARY OF THE INVENTION

It is an object of the present invention to overcome or at least reduce the above noted problem.

The concept of the invention is to provide a mechanism that is operative when an incoming call is accepted or outgoing call is initiated to transfer the audio to the most appropriate path for the user.

In one form of the invention, a switch is provided on the handset and/or the headset which is provided with a dual function so that if the switch on the handset is actuated to receive a call, or initiate an outgoing call, the audio is automatically routed to the handset. Alternatively, if a switch located on the headset is actuated to receive or initiate a call, then the audio is automatically routed to the headset. Since the switch will be connected to a software control function, this automatic path selection may be varied by appropriate manipulation.

In a further form of the invention a dedicated audio path switch is provided so that when a call is made, the user may select or toggle to the appropriate audio path.

In a further form of the invention, a mechanism is provided for automatically detecting which of the handset or headset is being used by the operator, such mechanism being coupled to an audio path control to automatically route the audio to the set which is in use. For example, a pressure detector may be provided on the headset clamping mechanism to indicate the headset is in use. Alternatively, a capacitive proximity detector may be provided on the handset to monitor the proximity of a user's head, to determine whether the handset is in use.

Accordingly, the invention provides in a first aspect, a mobile station for a mobile telecommunications system comprising a handset and a headset for connection to the handset, the handset including RF transceiver means for transmitting an outgoing call and receiving an incoming call, processor means coupled to the RF transceiver means for providing audio signals on a first audio path to audio transducer means in the handset and on a second audio path for audio transducer means in the headset, characterised in that: the headset and/or the handset includes a switch means arranged such that operation thereof has the effect both of initiating and/or accepting a call, and of routing audio signals to a selected one of the first and second audio paths.

In a second aspect, the invention provides a mobile station for a mobile telecommunications system, as aforesaid but characterised in that the headset and/or the handset includes a first switch means operative upon receipt of an incoming call to accept the call, and a second switch means, manually operable for toggling the audio path to a selected one of the loudspeaker and headset.

In a third aspect, the invention provides a mobile station for a mobile telecommunications system as aforesaid, but characterised by means for detecting use of the headset or handset by the user and coupled to audio path control means for automatically enabling the respective first or second audio path to the set in use.

In a more general aspect, the present invention provides a mobile station for a mobile telecommunications system, comprising a handset and a headset arranged for coupling to the handset, and means operative upon acceptance of an incoming call to the station to selectively route the audio path to one of the headset and handset.

In a fourth aspect, the invention provides a method of operating a mobile station as aforesaid, the method being characterised by monitoring the handset for receipt of an incoming call, and if detected, operating said switch means to accept the call, and routing the audio to a selected one of the first and second audio paths, and if an incoming call is not detected, but said switch means is operated, initiating a call, and routing the audio to a selected one of the first and second audio paths.

BRIEF DESCRIPTION OF THE DRAWINGS

Preferred embodiments of the invention will now be described with reference to the accompanying drawings, wherein:

FIG. 4 is a schematic view of a second embodiment of the invention, with a separate audio path toggle control; and FIGS. 5 to 8 are diagrams of various automatic means for detecting use of a handset or headset, incorporated in further embodiments of the invention.

DESCRIPTION OF THE PREFERRED EMBODIMENTS

The invention consists of a dual function to the controls on the handset and/or headset that control call answering and initiation, or a dedicated audio path control on the handset and/or headset, or an automatic means of detection of the audio path in use, whereby the audio path for the call is routed to the appropriate path, or is transferred to the most suitable path at the user's operation of the control. Thus, the correct path is either automatically chosen, or can be chosen by the user in a simple and quick manner. For example:

With headset connected (whether via a cord or cordlessly, wire or wirelessly), if incoming call answered or initiated using call control (typically a switch button) on the headset, audio automatically routed to headset.

With headset connected, if incoming call answered on handset, then audio automatically routed to handset. In case of call initiated on handset, optional set default routing to headset or handset.

With headset connected, if incoming call answered or initiated on handset, and following that the control on the headset is activated, audio transfers from the handset to the headset.

With headset connected, if incoming call answered or initiated on the headset, and following that the control on the handset is activated, audio transfers from the headset to the handset.

Further control operation transfers the call as expected, or terminates the call if the control on the apparatus currently selected is operated again.

Where no headset is connected, audio routes to handset.

Figure 1:
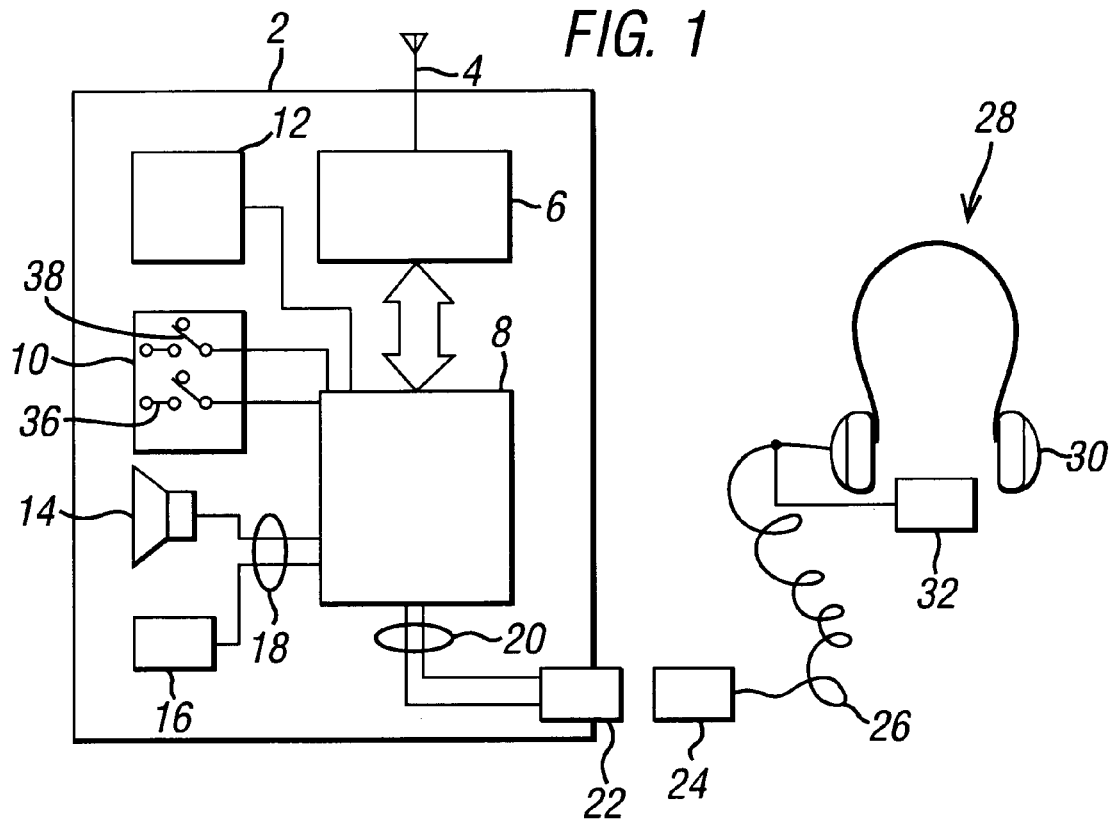
FIG. 1 is a schematic view of a known mobile station comprising a handset and corded headset.
Figure 2:
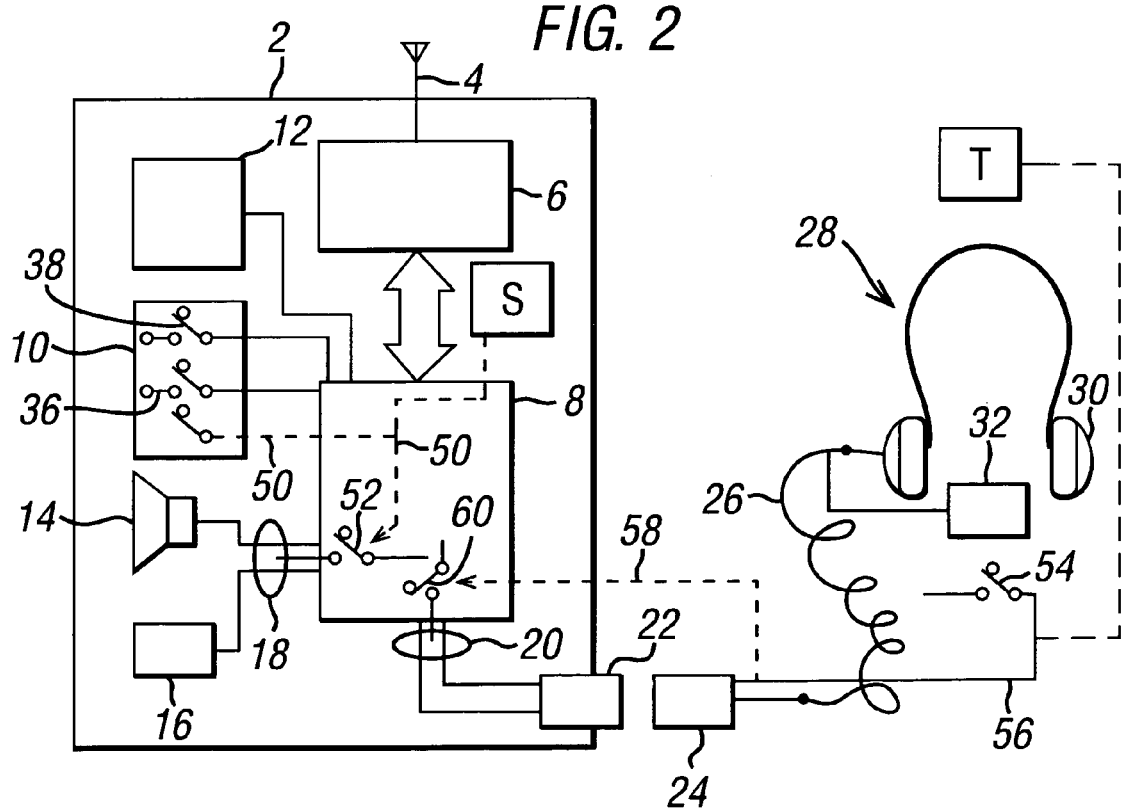
FIG. 2 is a schematic view of a mobile station according to a first embodiment of the invention and employing dual function keys for automatic routing of the audio path.

Referring now to FIG. 2, similar parts to those shown in FIG. 1 are indicated by the same reference numeral. Button switch 36 in key pad 10 is coupled by a software control function indicated schematically at 50 to a switch 52 in the first audio path 18. Switch 52 is also indicated schematically; it will in practice be implemented as a transistor switch or switches within processing section 8. A further button switch 54 is provided in headset 28 and is coupled via a line 56 through connectors 22, 24 to processing section 8. This line 56 is coupled via a software function, indicated schematically as at 58, to control a switch 60 in the second audio path. Again, switch 60 may be implemented as a transistor switch or switches in processing section 8.

Thus, in operation, when the mobile station indicates by ringing an incoming call, or when a user wishes to initiate a call, the user has the choice of operating switch 36 or switch 54. Which switch is operated will depend on the user's convenience. Clearly if the headset is not connected, then the handset switch 36 will be operated. Alternatively, if the headset is connected and in position for use, then headset switch 54 may be operated. If switch 36 is operated, the audio path 18 is completed to loudspeaker 14 and microphone 16 by closure of switch 52. If the headset switch 54 is operated, then the second audio path 20 to headset 28 is closed by closure of switch 60.

Figure 3:
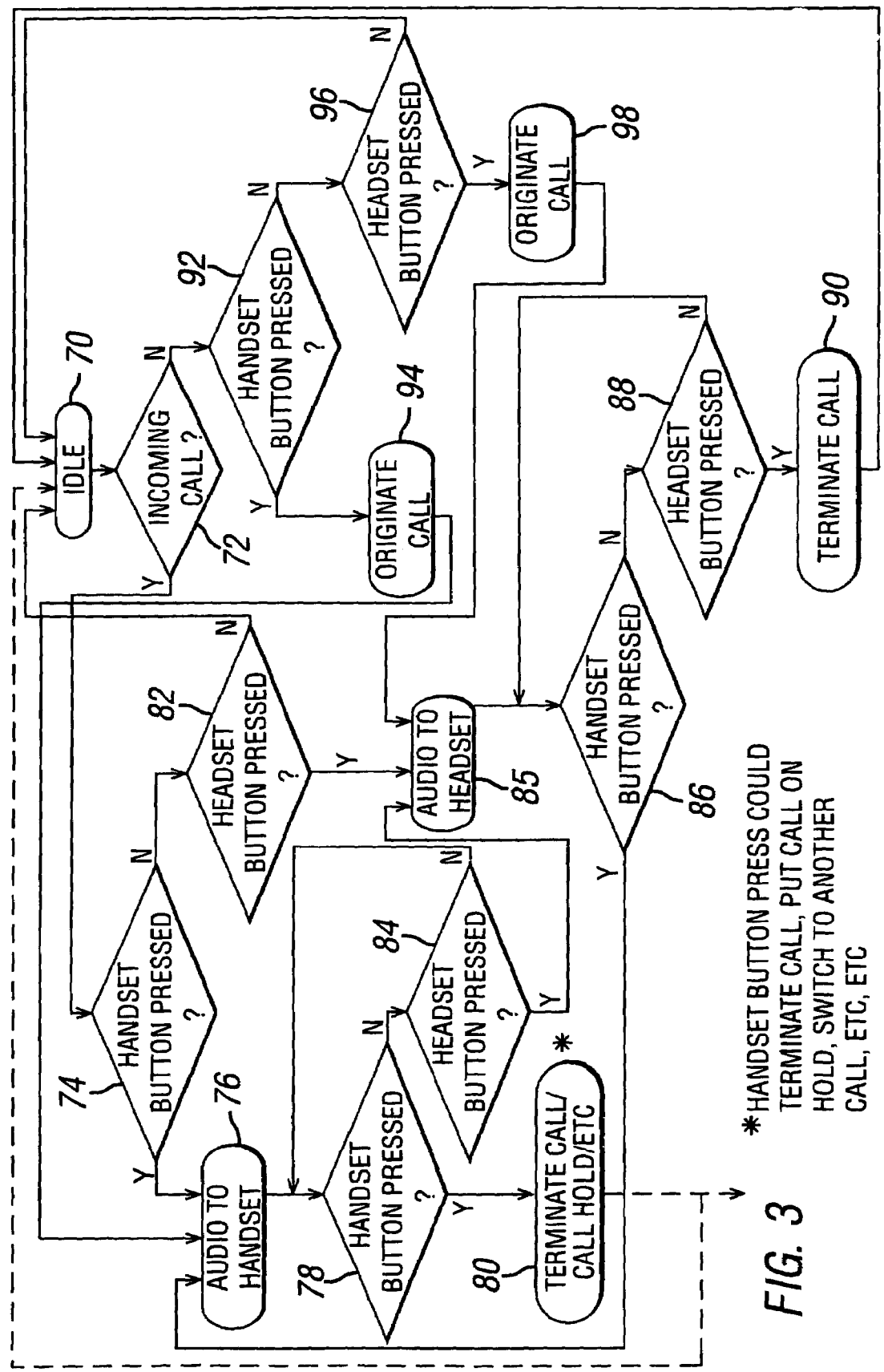
FIG. 3 is a flowchart illustrating the operation of the dual function keys of the embodiment of FIG. 2 for appropriate routing of the audio path.

Referring now to FIG. 3, this is a flowchart of a software routine that is stored in digital processing section 8 and that is responsive to the condition of switches 36 and 54 to close the appropriate audio path. Thus, from an idle state 70, an incoming call is monitored as at 72. If there is an incoming call and the handset button 36 is pressed, 74, then switch 52 is closed to route the audio on path 18 to the handset speaker and microphone 14, 16, as at 76. The handset button continues to be monitored, 78, and if depressed again, 80, the call is terminated or a call hold function is implemented, depending on the preconfiguring of the handset.

If at 74 or at 78, the handset button is not pressed, a check is then made on the headset button 54 as at 82, 84. If button 54 is pressed then the audio is routed by closure of switch 60 on second audio path 20 to the headset, 85. Monitoring of the switches 36, 54 continues to take place, 86, 88 and if the handset button 36 is found to be depressed, then the audio is routed back to the first audio path, 76. If the headset button 54 is depressed, then the call is terminated, 90.

Referring back to decision point 72, if there is not an incoming call, the handset button switch 36 is nevertheless monitored, 92, and if found to be pressed, a call is originated or initiated, 94, and the first audio path to the handset is enabled, 76. If the handset button 36 is not depressed but monitoring of the headset button switch 54 shows it to be depressed, 96, then a call is originated or initiated, 98, and the second audio path 20 is enabled, 86. If the headset button 54 is not depressed then the software returns to idle state 70.

The software function shown in FIG. 3 for call initiation and answering can be put under user control (instead of following the sequence as above) using, for example, short and long button presses, or double click action.

Referring now to FIG. 4, similar parts to those shown in FIG. 2 are denoted by the same reference numeral. A button switch 140 is provided in key pad 10, and this is coupled by a software control routine indicated schematically at 142 to switches 52 and 60 in the first and second audio paths 18, 20. Thus, in this embodiment a call is initiated or accepted by closure of switch 36, and the audio can be switched or toggled between the first and second audio paths at any time by actuation of toggle switch 140.

The embodiments shown in FIGS. 5 to 8 operate by an automatic sensing of the use of the handset or headset. The sensors are shown schematically in FIG. 2 as S and T. Switch S is coupled to software link 50 for operation of switch 52 in first audio path 18. Switch T is linked by line 56 to software link 58, in order to operate switch 60 in second audio path 20. Thus, closure of automatic switch S or automatic switch T will have the effect of automatically enabling the respective first or second audio path 18, 20.

Referring to FIG. 5, sensor switch S is implemented as a pair of sensor electrodes 150 in the mobile handset 2 connected to a capacitance measuring circuit 152 and thence to a threshold circuit 154. When the capacitance sensed by the electrodes 150 increases as it is brought near the head, a signal is provided by threshold circuit 154 to close switch 52, via software link 50.

In FIG. 6, an infrared transmitter 160 provides an infrared beam which is reflected during use of the handset by head to an infrared receiver 162. The infrared receiver is coupled to a threshold circuit 164 which provides a switch closure signal for switch 52 in audio path 18.

In FIG. 7, an audio transducer 170 is provided in the handset. A driving circuit 172 provides an electric signal to the transducer 170, and also detects the electrical impedance of the transducer. When the ear is held close to the transducer, the sound waves generated by the transducer will be channelled into the ear canal, and the apparent impedance of the transducer will change. This change is detected by driving circuit 172 and employed to switch 52 in first audio path 18.

Figure 8:
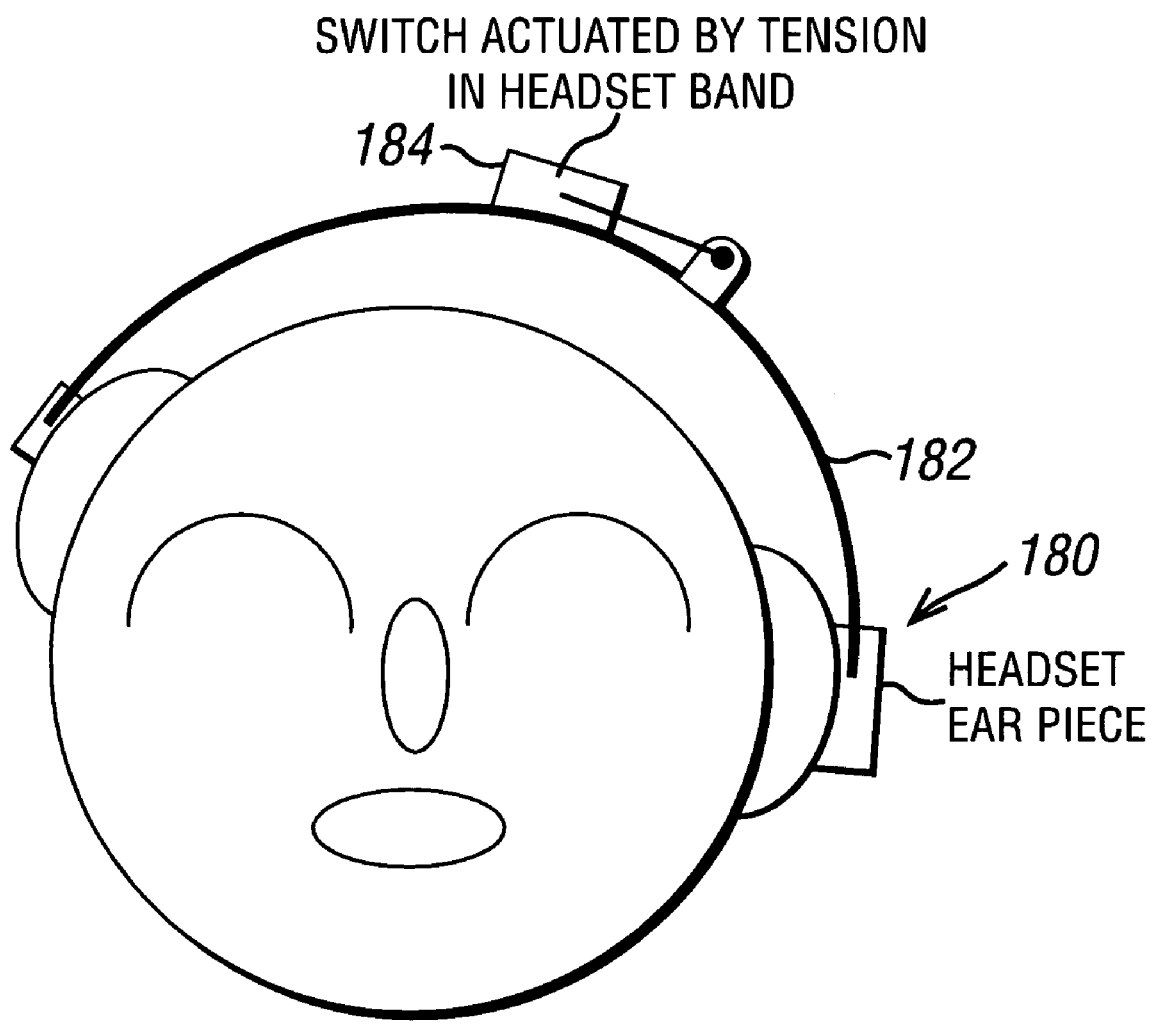

In FIG. 8, a headset is provided comprising a pair of headphones 180 with a headset band 182. A switch 184 is provided on the headset band 182. When the headset band 182 is tensioned by being placed on the head, the switch is closed by the tension in the headset band. The switch may be of any type reacting to mechanical stress, for example, piezoelectric or magnetostrictive. Closure of the switch causes closure of switch 60 in second audio path 20.

It is possible in all the above embodiments to optionally indicate (using LED, LCD icon, etc.), of where the audio is currently routed.

The present invention provides the following advantages:
Simplified use of headset with mobile phone, avoiding user frustration.
Enhanced human factor performance.
Enhanced customer satisfaction.

What is claimed:

1. A mobile station for mobile telecommunications system comprising:
   a handset
   a headset for connection to a handset;
   the handset including a transceiver for transmitting an outgoing call and receiving an incoming call, a processor coupled to the transceiver for providing audio signals on a first audio path to a first audio transducer in the handset and on second audio path to second audio transducer in the headset; and
   a single first user operable switch disposed in the handset, said single switch configured such that the operation thereof has the effect both of initiating and/or accepting a call, and of routing audio signals to said audio path corresponding to said handset regardless of whether said headset is connected to said handset and regardless of the condition of any other user operable switch of said mobile station.

2. The mobile station according to claim 1, wherein the audio transducer in the headset and handset each comprise a microphone and a loudspeaker.

3. The mobile station according to claim 1, further comprising a single second switch located in the headset and configured to initiate and/or accept a call and route it on said second audio path.

4. The mobile station according to claim 3 wherein operation of the first switch followed by operation of the second switch, or vice versa, is effective to select the other of the selected one of the first and second audio paths.

5. The mobile station according to claim 1, wherein operation of the first switch during a call routed on the first audio path is operative to terminate a call.

6. A method of operating a mobile station for a mobile telecommunications system, the mobile station comprising a handset and a headset for connection to the handset, the handset including a transceiver for transmitting an outgoing call and receiving an incoming call, a processor coupled to the receiver for providing audio signals on a first audio path to an audio transducer in the handset and on a second path to an audio transducer in the headset, a single first switch and a singe second switch, the method comprising the steps of:
   monitoring the handset for receipt of an incoming call and, responsive to operation of the single first switch, initiating or accepting a call and routing the call on the first audio path regardless of whether said headset is connected to said handset and regardless of the condition of any other user operable switch of said mobile station, and responsive to operation of the single second switch, initiating or accepting a call and routing the call on the second audio path.

7. The method according to claim 6 further comprising the steps of:
   responsive to operation of the first switch during a call routed on the first audio path, terminating the call; and
   responsive to operation of the second switch during a call routed on the second audio path, terminating the call.

8. The method according to claim 6, wherein the first switch is located in the handset and the second switch is located in the headset.

9. The method according to claim 8, further comprising the steps of;
   responsive to operation of the first switch during a call routed on the second audio path, rerouting the call on the first audio path; and
   responsive to operation of the second switch during a call routed on the first audio path, rerouting the call on the second audio path.

10. The method according to claim 6, wherein initiating a call comprises one of accepting an incoming call and starting an outgoing call.

11. The method according to claim 6, wherein at least one of the first and second switches are operating automatically via detection of use of the handset and/or headset, respectively.

12. The method according to claim 11, wherein said step of automatically detecting comprises detecting proximity of the handset to a user's head via capacitance change as the handset is brought within vicinity of the user's head.

13. The method according to claim 11, wherein said step of automatically detecting comprises detecting proximity of the handset to a user's head via infrared sensing.

14. The method according to claim 11, wherein said step of automatically detecting comprises detecting proximity to the handset of a user's head via acoustic impedance sensing.

15. The method according to claim 11, wherein said step of automatically detecting comprises detecting tension in a headband of the headset.

* * * * *